United States Patent [19]

White

[11] 4,160,534
[45] Jul. 10, 1979

[54] OPERATING STATION FOR AIRCRAFT REFUELING BOOM

[75] Inventor: Thomas H. White, Issaquah, Wash.

[73] Assignee: The Boeing Company, Seattle, Wash.

[21] Appl. No.: 865,833

[22] Filed: Dec. 30, 1977

[51] Int. Cl.$^2$ .............................................. B64D 39/00
[52] U.S. Cl. ............................ 244/135 A; 244/118 P; 244/129.3; 297/346; 350/301
[58] Field of Search .............. 244/119, 118 R, 118 P, 244/117 R, 3, 122 R, 129.1, 129.3, 135 A, 83 F; 297/232, 241, 257, 346; 248/429; 296/65 R; 35/12 R, 12 B, 12 H, 12 N, 12 W; 350/301, 302, 307; 89/37.5 R

[56] References Cited

U.S. PATENT DOCUMENTS

| | | | |
|---|---|---|---|
| 1,841,176 | 1/1932 | Fromer | 350/307 |
| 1,882,315 | 10/1932 | Clayton | 244/122 R |
| 2,362,887 | 11/1944 | Corte | 89/37.5 R |
| 2,373,185 | 4/1945 | Hurley | 244/118 P X |
| 2,374,027 | 4/1945 | McMaster et al. | 350/302 X |
| 2,389,997 | 11/1945 | Pontius et al. | 89/37.5 R |
| 2,396,314 | 3/1946 | Brown et al. | 89/37.5 R X |
| 2,942,811 | 6/1960 | Bell | 244/118 P |
| 3,088,537 | 5/1963 | LeTourneau | 296/65 R X |
| 3,127,191 | 3/1964 | Goldman | 350/302 X |
| 3,190,589 | 6/1965 | Mennborg | 244/122 R |
| 3,826,434 | 7/1974 | Von Beckh | 244/122 R |
| 3,827,788 | 8/1974 | Clark | 350/302 |
| 3,938,761 | 2/1976 | Hempenstall | 244/118 P X |
| 3,981,465 | 9/1976 | Sinnett et al. | 244/122 R X |

Primary Examiner—Barry L. Kelmachter
Attorney, Agent, or Firm—Hughes and May

[57] ABSTRACT

A refueling boom operator's seat located within the lower rear portion of the aircraft fuselage, the seat positioning the operator in a moderately reclining sitting position facing rearwardly to view the operating area of the refueling boom. Two rearwardly and outwardly diverging leg well structures provide recesses to accommodate the operator's legs, and a viewing window is positioned between the operator's legs at approximately the position of the operator's knees. These components are so arranged relative to the main rear pressure bulkhead and other components of the fuselage that the operator has a direct unobstructed view of the boom's normal refueling envelope. A pair of mirrors at the upper and lower portions of the window provide an indirect view of an upper portion of an extreme envelope, into which the boom is able to move above its normal refueling area.

26 Claims, 10 Drawing Figures

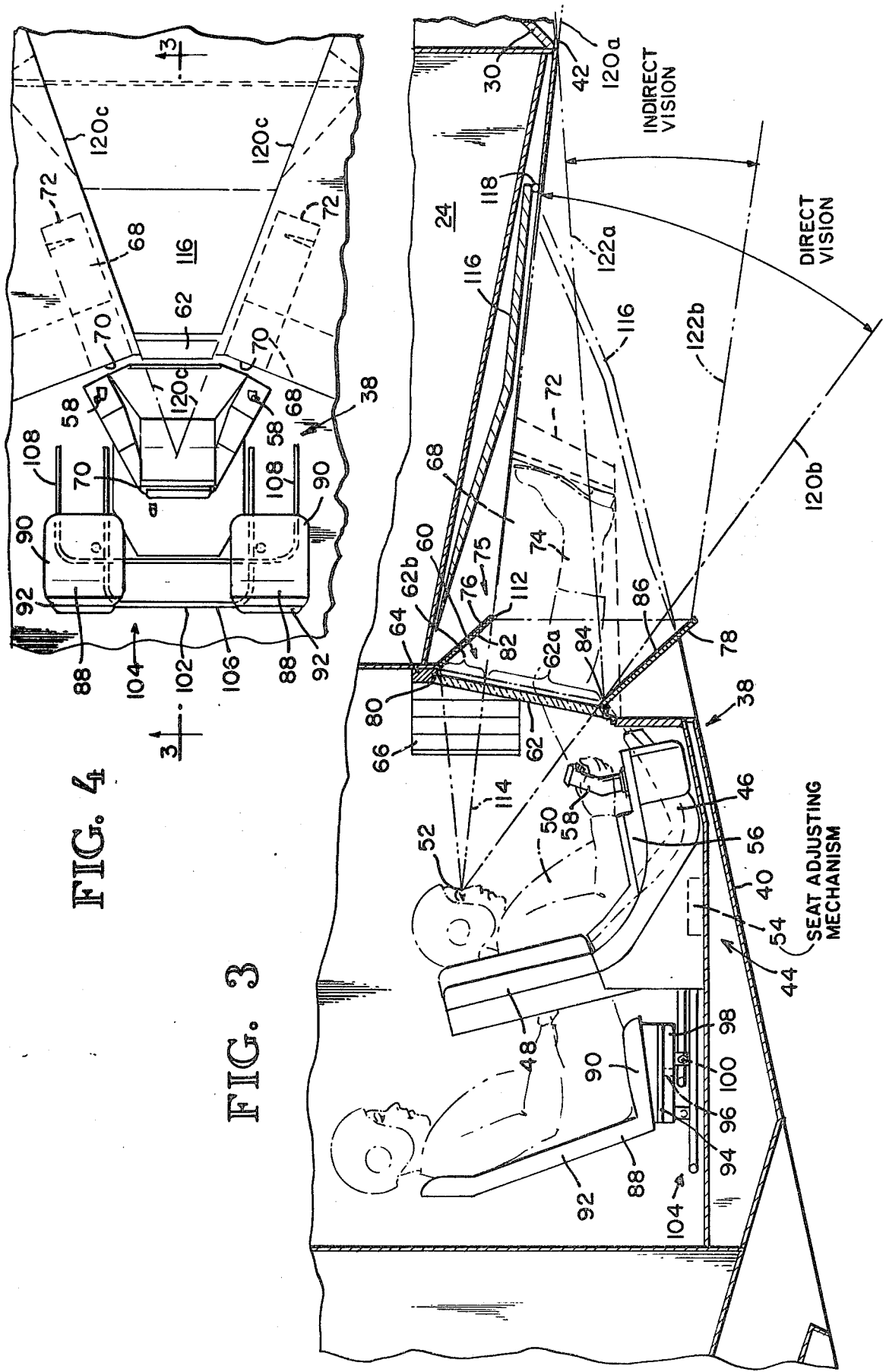

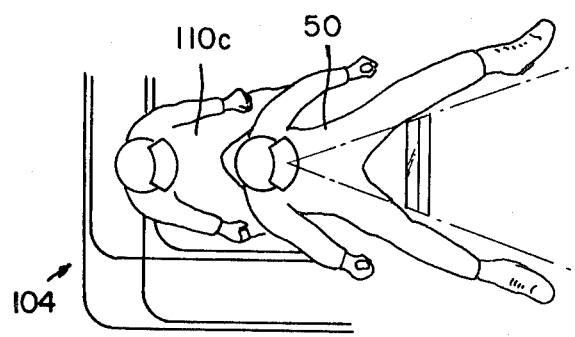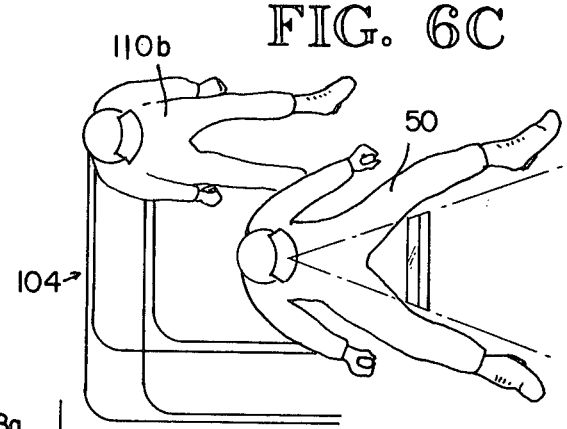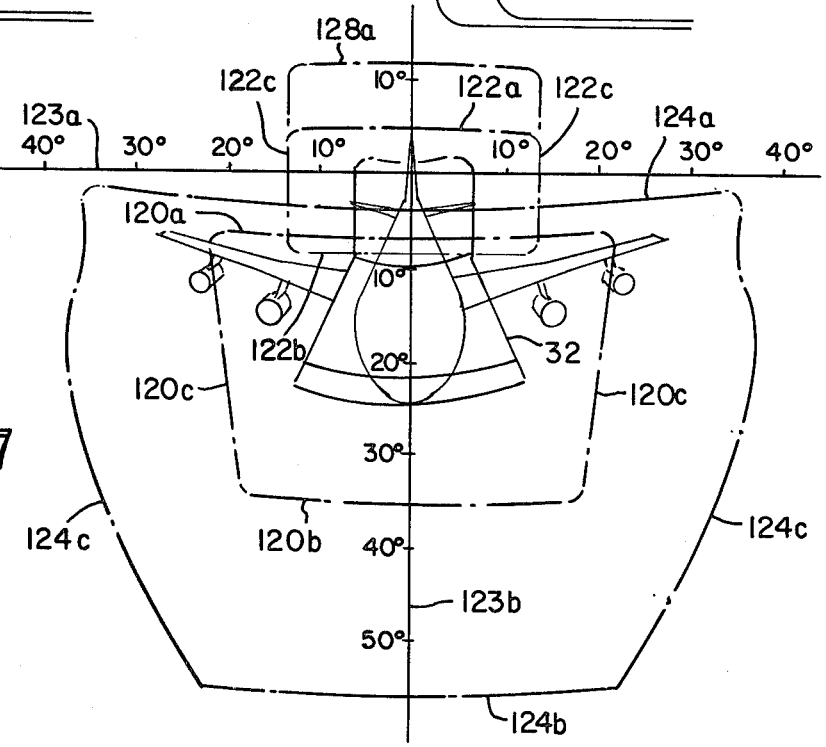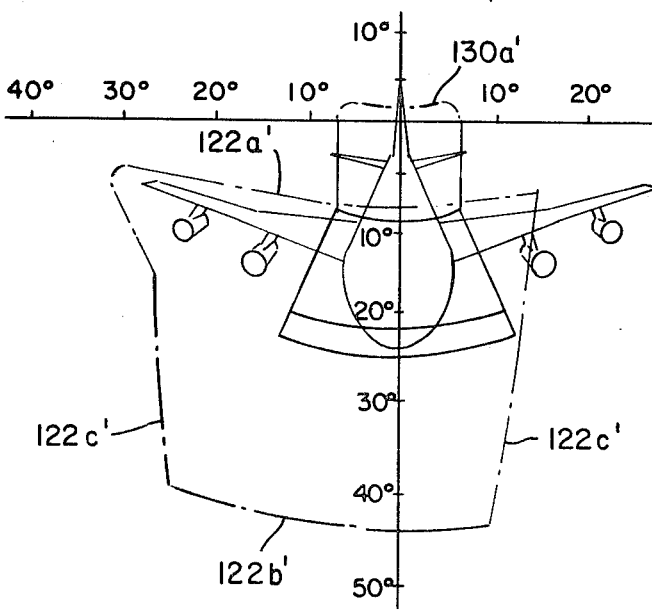

OPERATING STATION FOR AIRCRAFT REFUELING BOOM

BACKGROUND OF THE INVENTION

A. Field of the Invention

The present invention relates to an operating station for an aircraft particularly adapted for operation of an aircraft refueling boom.

B. Brief Description of the Prior Art

The usual method of aerial transfer of fuel from a tanker aircraft to a receiver aircraft involves the use of a refueling boom which is pivotally mounted by a gimbal device to the lower rear end of the tanker. At the outer end of the boom there is provided an aerodynamic control apparatus (i.e. a ruddevator assembly) which is controlled by an operator position in the aircraft at a location proximate the inner pivot end of the boom. In effect, the operator manipulates the ruddevator through appropriate controls to "fly" the boom into position for proper rendezvous with the receiver aircraft, so that the boom outlet can be properly positioned in the inlet receptacle of the receiving aircraft. During refueling, there will be some relative movement between the two aircraft, so the operator continues to "fly" the boom during the refueling operation so that the boom follows the receiving aircraft without transmitting excessive lateral loads to the boom. The limits within which the boom is designed to be moved angularly during the refueling operation is called the "refueling envelope."

In the operating stations which are now commonly in use for refueling operations, the operator lies on his stomach facing rearwardly, with his chin supported on a "doughnut-like" cushion. From this position, the operator views the discharge end of the boom and operates a pair of hand controls to manuever the boom to its proper position. One of the advantages of this arrangement is that it enables the operator to be positioned so that the operator's head is near the skin at the lower portion of the fuselage so that the dimensions of the viewing window can be kept relatively small and yet afford the operator a relatively wide view of the refueling area. Another advantage is that it is possible to locate the operator's sight along a line reasonably close to the lengthwise axis of the boom so that the operator is more nearly "looking along" the length of the boom. Not only does this give the operator a better perspective in making the initial hook-up, but it better enables him to detect any "bowing" of the boom, which would indicate that undesired lateral forces are being exerted on the boom by the receiver aircraft.

However, correctly controlling a refueling boom is a precision operation requiring a great deal of skill. Unfortunately not only is this prone position somewhat awkward, but when the refueling operation extends over a period of time, this arrangement is more conducive to operator fatigue, which in turn tends to degrade the operator's ability to maneuver the boom which precision. Also, when a second person is positioned in the refueling boom operating station (e.g. in a situation where there is an observer or an instructor), the operation becomes particularly cumbrous. The second person must also assume a prone position to one side or the other of the operator. To get a view of both lateral extremes of the operating area of the boom, it's necessary for the second person to somehow move his head over the prone body of the operator.

Accordingly, there have been proposals in the prior art to modify the operating station so that the operator can be positioned more conveniently without interfering with the precision operation of the boom. It has been recognized that certain advantages would accrue in positioning the operator in a more natural seated position from which he could operate the controls more conveniently and with less fatigue. However, there are physical limitations as to the amount of structural changes which can be incorporated in the lower aft end of the fuselage to make room for an operator in a sitting position and provide the operator with a "window" of sufficiently large area for proper viewing of the refueling envelope, without causing substantial structural modifications which necessarily result in penalties with regard to weight, cost, etc. For example, some of these designs entail modifications to the rear pressure bulkhead of the fuselage.

One proposal has been to place the operator at a location further removed from the pivot location of the boom and provide him with auxiliary optical equipment (e.g. television cameras and/or periscope-like devices) to obtain a satisfactory view of the boom operating in the refueling envelope. However, this indirect viewing of the boom tends to cause the operator to loose the proper perspective and diminish the "sense of realism" which direct vision gives. Another proposal has been to position the operator in a "blister-like" structure which protrudes outwardly from the skin of the aircraft. However, this has adverse aspects in terms of cost, weight, and aerodynamic drag. Also there is an undesirable psychological effect in that the operator sometimes feels precariously placed in such an appendage which is outside of the normal fuselage structure. Attempts to move the operator at a further forward location in the fuselage generally result in giving the operator a less advantageous view for precision operation of the boom.

With regard to the prior art disclosed in the patent literature, U.S. Pat. No. 2,663,523, Leisy, discloses an aircraft refueling boom where the operator is located in a seated position in the fuselage moderately to the rear of the pivot mounting of the refueling boom. One of the problems with this particular arrangement is that to give the operator an adequate view of the boom moving to the extreme of its operating limits, a relatively large viewing window is required, which in turn necessitates additional reinforcing structures.

There are also in the prior art patents a number of arrangements for positioning a gunner or an operator of armaments of some sort.

For example, U.S. Pat. No. 2,067,585, Trimback, discloses a gunner seat having a curved track along which the seat moves so that it can be positioned at various angles.

U.S. Pat. No. 2,362,887, Corte, shows another form of a rotatably mounted gunner seat.

U.S. Pat. No. 2,366,410, Klemper et al, shows a gun mounting where the operator is positioned remote from the gun mounting itself, with the operator obtaining a view for operation of the gun through a periscope-like device.

U.S. Pat. No. 2,373,185, Hurley, discloses a particular configuration of a pressurized chamber for an operator of a gun in an aircraft.

U.S. Pat. No. 2,389,997, Pontius 3d, et al, shows a periscope arrangement for a gun turret.

U.S. Pat. No. 2,396,314, shows yet another periscope arrangement through which a gunner can obtain a view for operating aircraft armaments.

Another optical device for sighting of aircraft armaments is shown in U.S. Pat. No. 2,399,676, Holschuh et al.

U.S. Pat. No. 2,938,434, Myron, shows a missile turret at the aft end of an airplane which is operated from a remote position in an aircraft.

Another group of prior art patents show miscellaneous seating arrangements for aircraft pilots or other personnel.

For example, U.S. Pat. No. 1,882,315, Clayton, shows a pilot's seat, the position of which is adjustable to provide an improved view for the pilot in various situations.

U.S. Pat. No. 2,669,284, Pall et al, shows yet another arrangement for a vertically adjustable pilot's seat.

U.S. Pat. No. 3,079,112, Campbell et al, shows a vertically adjustable seat for a pilot which enables the pilot to perform additional duties in the aircraft by moving him to different operating locations.

U.S. Pat. No. 3,190,589, Mennborg, shows an arrangement for an ejection seat for a high speed aircraft.

U.S. Pat. No. 3,826,434, Von Beckh, shows a seat which is adjustable to enable the operator to withstand a high "G" environment.

U.S. Pat. No. 3,981,465 shows a supinaping seat for an aircraft cockpit, in which the pilot is provided with controls positioned on right and left arm rests of the seat.

U.S. Pat. No. 3,994,453, Firestone, shows a seating arrangement where a pilot, flying solo, can fly an airplane having dual controls.

Also shown in the prior art are various arrangements for improving the view of passengers in an aircraft.

U.S. Pat. No. 2,942,811, Bell, shows an aircraft having a window in the floor of the fuselage, with the passenger seats being arranged around the window for a view of the terrain below.

U.S. Pat. No. 3,938,761, discloses an arrangement where the passengers of an aircraft are placed in a forward transparent portion of the fuselage for a rather wide view, and the pilot is placed above, behind the passengers.

U.S. Pat. No. 3,558,209, Trufanoff, et al, provides an optical viewing window for an SST aircraft where the passengers see an image that is presented on a projection screen.

Another group of prior art patents show a variety of optical devices which give the operator of a vehicle a rear view. U.S. Pat. No. 1,841,176, Fromer, shows a rear view mirror placed beneath the floorboard of an automobile to provide a rear view.

U.S. Pat. No. 2,374,027, McMaster et al, shows a periscope-like device designed for use in either an aircraft or a mobile land vehicle, whereby the operator can obtain a rear view.

Another periscope device for automobiles is shown in U.S. Pat. No. 3,127,191, Goldman.

A one-way mirror periscope rear vision system is shown in U.S. Pat. No. 3,827,788, Clark.

U.S. Pat. No. 3,088,537, discloses an operator's cab for a work performing land traveling land vehicle, such as a "log stacker."

It is an object of the present invention to provide an operating station for a refueling boom, in which the operator is placed in a convenient sitting position with an adequate view of the refueling envelope of the boom, which operating station is so arranged as to keep to a practical minimum undesired structural modifications of the basic aircraft structure. It is a further object of the present invention to provide the operating station for a refueling boom in which two or three people, such as an operator and one or two observers or instructors, can function with reasonable convenience.

SUMMARY OF THE INVENTION

The operating station of the present invention is positioned in the fuselage of an aircraft, which fuselage has a longitudinal center axis, a transverse axis, a forward end, and a rear end. The aircraft has a refueling boom extending rearwardly from the aircraft, with the refueling boom having an operating envelope (i.e. refueling envelope) within which it performs its refueling functions. The refueling envelope has an upper envelope boundary, a lower envelope boundary and side envelope boundaries.

There is an operator's seat at a lower rear portion of the fuselage. Desirably the seat has a seat platform and a backrest, with the seat being arranged to establish at a predetermined viewing location a rearwardly directed eye reference point for an operator positioned on said seat. There are two leg accommodating structures (i.e. leg wells) extending rearwardly and divergently from the operator's seat and arranged in a manner to receive legs of an operator positioned in said seat.

A window structure is positioned rearwardly of the eye reference point at a location between the leg accommodating structures. This window provides a direct viewing area defined by an upper viewing limit, a lower viewing limit, and side viewing limits.

In the preferred form, the seat, the leg accommodating structures and the window structure are positioned and arranged relative to each other, and also relative to the fuselage components and to the operating envelope of the refueling boom, in the following manner:

1. The fuselage components (in the preferred form including the rear pressure bulkhead) and the upper viewing limit of the window structure are located at or above a plane extending from the refueling envelope upper boundary to the eye reference point established by said seat location;
2. The leg accommodating structures and the side viewing limits of the window structure are positioned laterally outside of planes extending from the refueling envelope side boundaries to the eye reference point as established by said seat location; and
3. The lower viewing limit of the window structure is below a plane extending from the lower envelope boundary to the eye reference point as established by the seat location.

An instrument panel is positioned rearwardly of the eye reference point and laterally of said window structure at about the same longitudinal location as the window structure. The leg accommodating structures extend rearwardly beyond the location of the instrument panel. Control handles are located for the operator on opposite sides of the seat at convenient arm rest locations. The operator seat itself can be adjusted moderately both vertically and also along a longitudinal axis to accommodate operators of different body sizes in a manner to provide a constant eye reference point for the operating station.

To provide an auxiliary view of the area above the normal operating envelope of the refueling boom (i.e. the refueling envelope), there is provided an auxiliary viewing device. This comprises a first mirror means having a reflective surface extending downwardly and rearwardly at an upper portion of said window structure and directly visible from the location of said eye reference point. The two reflective surfaces are so arranged that light from a location immediately above the refueling envelope of the boom to the first reflective surface is directed upwardly to the second reflective surface and then to the eye reference point, thus providing an indirect view of the area above the normal refueling envelope.

In the event that a second person is to be positioned in the operating station, there is provided a second seat movable along a "U" shaped track mechanism which extends longitudinally on each side of said operator's seat and laterally at a location forward of the operator's seat. This enables a second person and possibly a third person in yet a third seat to position himself or themselves either directly behind or on either side of the operator's seat simply by moving the additional seat or seats along the track. The additional seat or seats are each mounted for rotation about a vertical axis and for horizontal linear movement about their respective bases.

Other features of the invention will become apparent from the following description.

BRIEF DESCRIPTION OF THE DRAWINGS

FIG. 3 is a side elevational view of the refueling boom operating station of the present invention;

FIG. 4 is a top plan view of the station shown in FIG. 3;

FIG. 6A, 6B, and 6C are top plan views of the operating station showing the operator in his working location and an instructor or observer in three different locations;

FIG. 7 is a view of a receiver aircraft as seen from the operator's working position; and FIG. 8 is a view of a receiver aircraft as seen from an instructor's position shown in FIG. 6A.

DESCRIPTION OF THE PREFERRED EMBODIMENT

Figure 1:
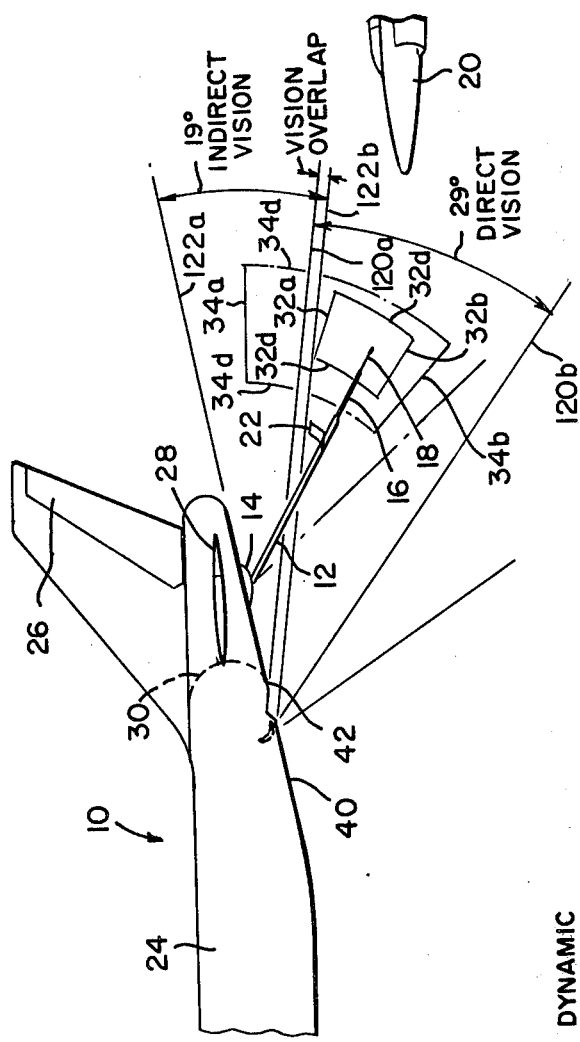
FIG. 1 is a side elevational view of a rear portion of a refueling aircraft incorporating the present invention.
Figure 2:
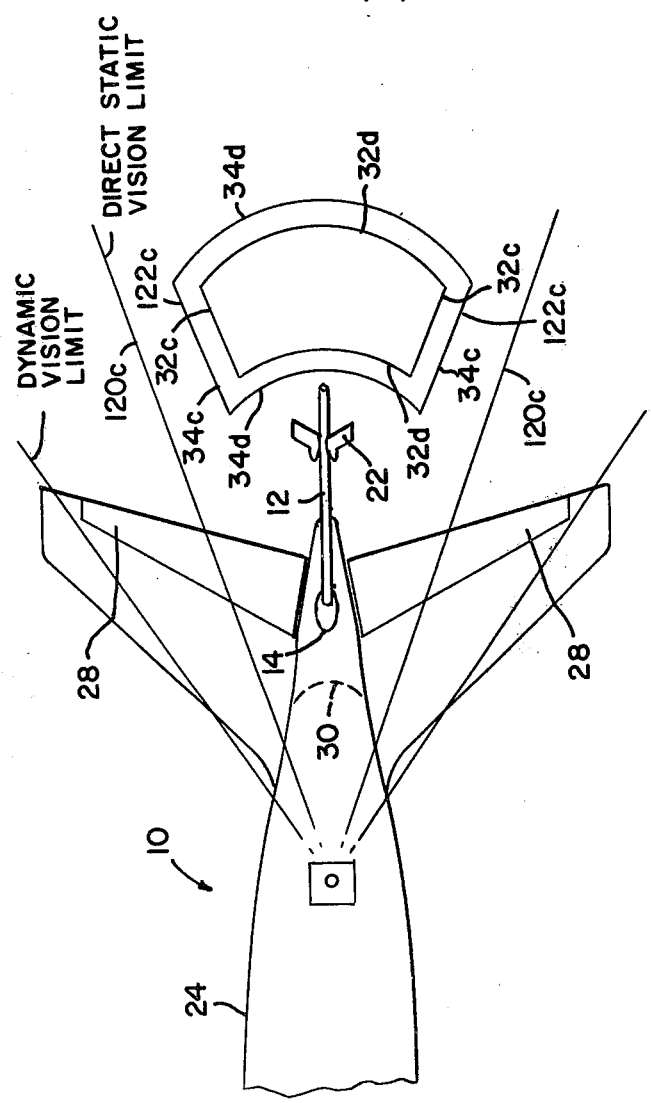
FIG. 2 is a top view thereof.

In FIGS. 1 and 2, there is shown an aircraft tanker 10, having a boom 12 gimbal mounted to the lower rear end of the aircraft at 14, and having at its outer end a refueling probe 16 mounted telescopically within the boom 12. At the outer end of the probe 16, there is a nozzle 18 which upon extension of the probe 16 becomes positioned in an intake recpetacle (not shown for convenience of illustration) at the upper forward end of a receiver aircraft, indicated at 20. At the outer end of the boom 12, there is a ruddevator assembly 22 which is utilized to control movement of the boom 12 during a refueling operation.

The aircraft 10 comprises a fuselage 24 having a forward end (not shown for convenience of illustration) and a rear end at which the aircraft is provided with a rudder 26 and elevators 28. Since a major portion of the fuselage 24 is at least in some circumstances pressurized, there is at the rear portion of the fuselage 24 a pressure bulkhead, indicated schematically at 30. For structural reasons (i.e. to withstand the forces produced by the pressurized air within the fuselage with the least amount of structure) this bulkhead 30 is commonly made in the configuration of a portion of a hemisphere. It is desirable that the structure of this bulkhead 30 not be interrupted in any way (e.g. by forming an opening therein), since this would require extra reinforcing structure for the bulkhead 30, which would in turn mean an increase in weight. As indicated earlier herein, one of the problems with some prior art proposals for a refueling boom operator's station in that they require "piercing" of this rear pressure bulkhead of the airplane.

The area at the end of the refueling boom 12 within which the boom 12 operates during refueling is commonly called the "refueling envelope." There is also a "control limit area" which includes the area outside of the refueling evelope within which the boom is able to be moved during flight, without encountering mechanical interference. The refueling envelope has an upper limit 32a, a lower limit 32b, side limits 32c, and forward and near limits 32d. The control limit area has an upper limit 34a, a lower limit 34b, side limits 34c, and forward and near limits 34d. The manner in which the main components of the present invention cooperate to provide adequate viewing for proper control of the boom 12 within the envelope limits is particularly significant in the present invention and will be described later herein.

Figure 5:
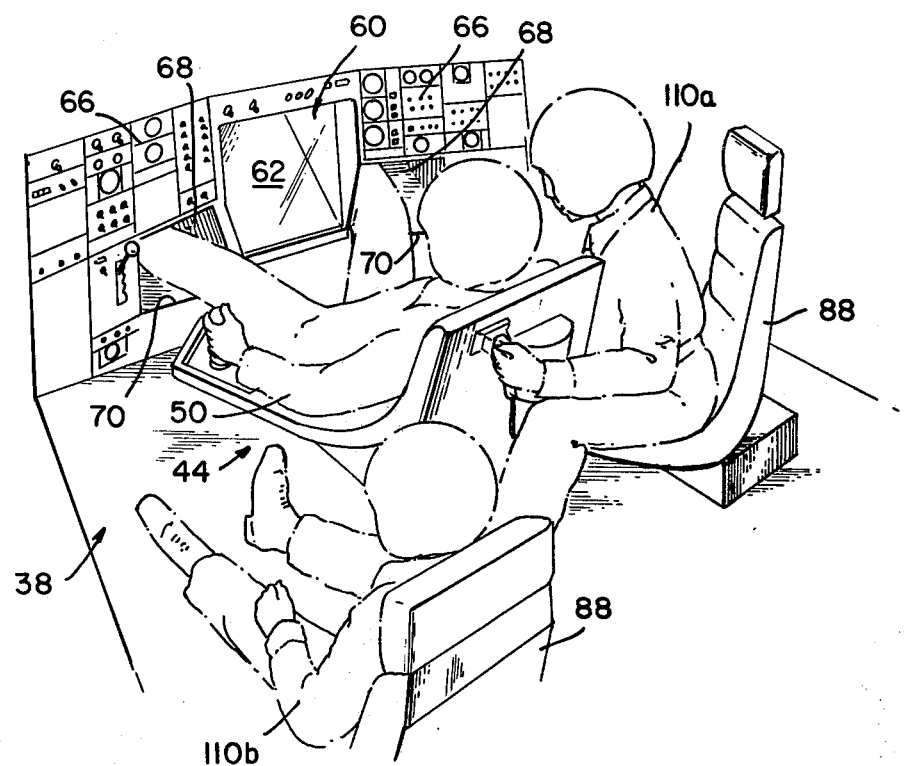
FIG. 5 is a perspective view of the operating station shown in FIGS. 3 and 4.

With reference to FIGS. 3 through 5, the main components of the operating station of the present invention will now be described. The operating station, generally deignated 38 is located in a lower rear portion of the aircraft fuselage 24 within the lower skin section 40 of the aircraft and moderately forward of the location of the bottom edge 42 of the rear pressure bulkhead 30.

There is an operator's seat 44 comprising a seat platform 46 and a backrest 48 extending upwardly and forwardly from the rear of the seat platform 46. The seat platform 46 and backrest 48 are so located that when an air refueling operator (indicated at 50) is positioned on the seat 44 so as to be supported by both the platform 46 and the backrest 48, an eye reference point 52 located for viewing in a rearward direction is established for the operating station 38. As its name indicates, this "eye reference point" coincides with the location of the eyes of the operator 50 when the operator 50 is properly positioned on the seat 44. To maintain a substantially constant eye reference point and make allowance for operators 50 of greater or lesser body size, the seat 44 is adjustable within moderate limits both vertically and longitudinally, with such an adjustment mechanism being indicated schematically at 54. Since such adjustment mechanisms 54 are well known in the prior art, the one used here will not be described in detail.

The operator's seat 44 is further provided with two armrests 56 positioned laterally outwardly of the seat platform 46, with each armrest 56 having a related control handle 58 thereon positioned so that the two handles 58 can be conveniently grasped by the operator 50 when he is positioned with his back against the backrest 48. Also, the armrests 56 with the handles 58 are positioned downwardly and off to the side a sufficient distance so that they would in no way interfere with the operator's view of the boom 12.

Positioned a short distance (e.g. about 2½ to 3 feet) rearwardly of the eye reference point 52 is a window structure 60 made up of a transparent window portion 62 and a surrounding window frame 64. Extending laterally from both sides of the window structure at about the same longitudinal location as the window structure 60 is an instrument panel 66.

There are two leg accommodating structures 68 (called "leg wells") located on opposite sides of the window structure 60. Each leg well structure has a forward entrance portion 70 at the longitudinal location of the window structure 60 and instrument panel 66, and the two leg well structures 68 extend from their entrance portions 70 rearwardly and divergently to terminate at closed rear end portions 72. The two leg well structures 68 are elongate box-like structures sized to accommodate the lower legs and feet (indicated at 74) of the operator 50, and the ends of the leg well structures are made adjustable to accommodate operators having different leg lengths. Thus, as can be seen most easily with reference to FIG. 5, with the operator 50 seated in his normal working position, the operator's two legs fit into the leg well structures 68 in a manner to "straddle" the window structure 60, with the operator's knees being at about the same longitudinal location as the window structure 60.

Positioned immediately rearwardly of the window structure 60 is an auxiliary viewing system 75 comprising an upper mirror 76 and a lower mirror 78. The upper mirror 76 extends from an upper edge 80 of the transparent window portion 62 downwardly and rearwardly at about a 45° angle from the horizontal. Thus, the upper mirror 76 provides a downwardly and forwardly directed reflecting surface 82. The lower mirror 78 extends from a lower edge 84 of the transparent window portion 62, also in a downward and rearward direction, with the reflective surface 86 of the lower mirror 78 being directed upwardly and rearwardly. As will be disclosed more fully hereinafter, the function of these two mirrors 76 and 78 is to provide an indirect (i.e. reflected) view of the upper portion of the control limit area of the boom 12. The lower mirror 78 can be adjusted about a horizontal axis passing through the plane of the mirror to either raise or lower the indirect view to a moderate extent.

The operating station 38 is arranged to include at least one, and possibly two, additional seats 88 which can be used for one or more observers or instructors. In the following description, each of the seats 88 will be designated an "observer's seat." Each observer's seat 88 is or may be of conventional configuration and thus comprises a seat platform 90 and a backrest 92. The seat platform 90 is mounted to an intermediate plate 94 which is in turn rotatably mounted about a vertical pivot axis 96 to an underlying base 98. The base 98 is supported by four swivel mounted rollers 100, each of which is in turn mounted to one of four related rail members 102 of a track mechanism generally designated 104.

The track mechanism 104 is generally "U" shaped and thus comprises a laterally extending base portion 106, positioned immediately forward of the operator's seat 44, and two leg portions 108 extending on opposite sides of the operator's seat 44. Each observer's seat 88 is mounted to its related intermediate plate 94 for limited horizontal linear movement (e.g. about 8 inches or so) relative to the plate 94 so that it could be moved from the pivot axis 96 either closer to or further from the operator's seat 44. This lineal movement, in combination with the rotational movement of the observer's seat 88 about the pivot axis 96, and also in combination with the arrangement of the track mechanism 104, permits each observer's seat 88 to be positioned quite conveniently in a variety of locations adjacent the back and sides of the operator's seat 44.

Figure 6A:
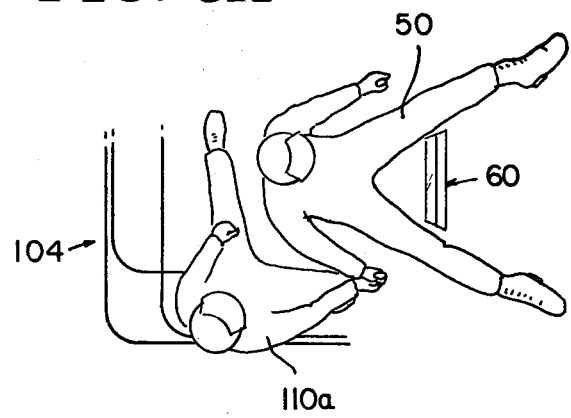

To explain this more fully reference is now made to FIGS. 5 and 6A through 6C. In FIG. 5 it can be seen that one observer, indicated at 110a, has moved his seat 88 to the rear and one side of the operator's seat 44, then rotated his seat 45° with respect to the longitudinal axis of the airplane, and finally moved his seat 88 toward the operator's seat 44 so that the observer 110a is partially straddling the operator's seat 44. Thus the observer 110a is in a position to look through the transparent window portion 62 toward the boom 12 by moving his head to a position next to the operator's head. This position is also shown in FIG. 6A. A second observer 110b can be seen in FIG. 5 to have positioned his seat at a location further from the operator's seat 44, at a position behind and off to one side of the operator 50, this position being shown also in FIG. 6C. FIG. 6B shows yet a third position where the observe 110C is directly behind the operator 50.

While the track mechanism 104 is or may be of conventional design, the particular track mechanism 104 disclosed herein is believed to be an improvement over conventional track mechanisms, and is described in U.S. patent application Ser. No. 866,628, filed Jan. 3, 1978, entitled "Seat Track Mechanism for Aircraft Refueling Boom Operating Station," the inventor being Tendon F. Wakeley, and the application being assigned the same assignee as the present application. Since a detailed understanding of this particular track mechanism 104 is not essential to an understanding of the inventive features of the present invention, and since the present invention could be practiced by use of conventional track mechanisms known in the prior art, a detailed description of this novel track mechanism 104, will not be included.

However, it can be stated briefly that each of the swivel mounted rollers 100 of each observer's seat 88 tracks in a related rail 102. The four rail members 102 each have a substantially identical "U" shaped planform configuration, with the rail members 102 being spaced one from another by longitudinal and transverse distances equal to the spacing and arrangement of the four swivel mounted rollers 100. Thus, as the observer's chair is moved along the track mechanism 104, the base 98 of each seat 88 maintains the same longitudinal and transverse orientation with respect to the airplane 10.

To analyze the operation of the present invention, reference is made to FIG. 3. The transparent window portion 62 can be considered as being made up of a lower direct viewing area which is bracketed and indicated as 62a, and an upper indirect viewing area, which is bracketed and designated 62b. The indirect viewing area 62b can be defined as that portion of the transparent window 62 which is positioned above a plane defined by the lower edge 112 of the upper mirror 76 and the eye reference point 52, this plane being indicated at 114 in FIG. 3. The lower direct view window portion 62a is that portion of the window 62 line below the above defined plane 114.

A door 116 is positioned immediately rearwardly of the window 60 and is hinge mounted by its rear end at 118 to the lower portion of the fuselage 24. The door 116 is shown in its closed position in broken lines in FIG. 3, and in this closed position its outer surface is aligned with the lower skin 40 of the fuselage 24. During operation of the boom, the door 116 is swung upwardly from its hinge mounting 118 so that it does not obstruct the view from the eye reference point 52 through the lower window section 62. The planform configuration for the door 116 is best shown in FIG. 4, and it can be seen to be of a generally trapezoidal configuration so that the two sides of the door diverge in a rearward direction, with the result that when the door 116 is raised, the view from the eye reference point 52 toward the boom 12 is not interrupted.

The manner in which the components of the present invention cooperate to provide a proper view of the refueling envelope of the boom 12 will now be described with reference first to FIGS. 1 and 2. The direct view from the eye reference point 52 to the area of the refueling envelope 32 is defined by upper and lower limits 120a and 120b respectfully (indicated in broken lines in FIG. 1), and lateral limits 120c indicated in broken lines in FIG. 2. The indirect view provided by the mirror assembly 75 has upper and lower limits indicated at 122a and 122b respectively, and side limits 122c. It can be seen that the limits of the refueling envelope (32a, b, c, & d) are well within the direct viewing limits 120a, b, & c.

Reference is now made to FIG. 3 where the upper and lower limits of the direct and indirect view are shown at the location of the operator's station 38. It can be seen that the plane of the upper direct viewing limit 120a passes from the eye reference point 52 through a location first beneath the lower edge of the mirror 76, below the lower edge of the rear pressure bulkhead 30, and also below the door 116 which is in its "up" position. The plane of the lower direct viewing limit 120b passes from the eye reference points 52 through a location just above the lower edge of the window 62.

With further reference to FIG. 3, it can be seen that the upper and lower limits 122a and 122b of the indirect viewing area extend divergently from, respectfully, the upper and lower edges of the reflective surface 86 of the mirror 78 and include an area just above the direct viewing area upper viewing limit 120a. It will be noted that there is a small amount of overlap between the upper direct viewing limit 120a and the lower indirect viewing limit 122b.

With regard to the direct viewing side limits 120c, reference is made to FIG. 4. These side limits are determined essentially by the lateral limits of the direct viewing portion 62a of the window 62, which are in turn determined by the lateral spacing of the two leg wells 68.

In FIG. 7, there is illustrated the limits of the view of the operator 50 when seated in his operating position, with the horizontal and vertical angular spread of the operator's view being shown by horizontal and vertical angular scales 123a and 123b, respectively. The static view (i.e. the view which can be obtained with the operator's head remaining at the eye reference point) is indicated in broken lines, with the upper, lower, and side limits being indicated at 120a, b, & c, respectively. It can be seen that the limits of the operating envelope (indicated generally at 32) are well within static direct viewing limits. Further there are outer dynamic viewing limits which can be obtained by the operator moving his head forwardly and to one side or the other. The upper, lower, and side limits of this dynamic viewing envelope are designated 124a, b, & c, respectively.

With regard to the static limits of the indirect view, the upper, lower and side limits are indicated at 122a, b, & c, respectively, this being the view obtained by means of the mirrors 78 and 76. The upper limit of the indirect view is indicated at 128a, this being obtained by adjusting the lower mirror 78.

Another advantageous aspect of the invention is that an observer or instructor, when seated at the position indicated at FIG. 6A (and also indicated in FIG. 5 at 110a) can obtain a reasonably good view of the refueling envelope. This is illustrated in FIG. 8. The upper, lower and side direct viewing limits of the instructor are indicated at 122a', b', & c' respectively. The limits of the indirect view, with the mirror 78 in a lower position are indicated at 122 a' and 122 c' for upper and side limits. By adjusting the mirror 78 for maximum "up" vision, the upper limit for the indirect view can be adjusted upwardly for a higher upper limit.

As indicated earlier herein, the operator 50 remains at all times comfortably seated, with the controls 58 being conveniently placed for precision operation. Also, an additional one or two persons (such as observers or instructors) can be positioned in the crew station quite comfortably, and yet are afforded quite adequate views of the refueling envelope.

What is claimed is:

1. In an aircraft comprising a fuselage with a longitudinal centerline, a transverse axis, a forward end and a rear end, said aircraft having,
    a. a refueling boom extending rearwardly from said aircraft and having a refueling envelope within which said boom operates during a refueling operation, said envelope having upper, lower and side envelope boundaries.
    b. a pressure bulkhead extending transversely across the rear end of said fuselage, said bulkhead having a lower edge portion at a lower portion of said fuselage, the improvement comprising an operating station for said boom, said station comprising:
    a. an operator seat at a lower portion of said fuselage at a location forward of said bulkhead, said seat having a platform and a back rest arranged to establish a rearwardly directed eye reference point for an operator positioned on said seat,
    b. two leg accomodating structures extending rearwardly and divergently from said operator seat in a manner to receive legs of an operator positioned in said seat,
    c. a window structure positioned rearwardly of said eye reference point at a location between said leg accomodating structures and forwardly of said pressure bulkhead, said window structure providing a direct viewing area defined by upper, lower, and side viewing limits,
    d. said seat, leg accomodating structures, and said window structure being positioned and arranged relative to each other and also relative to said rear pressure bulkhead and said refueling envelope in a manner that:
        (1) the lower edge of said bulkhead and the upper viewing limit through said window structure are located at least as high as a plane extending from the upper envelope boundary to the eye reference point,
        (2) said leg accomodating structures and the side viewing limits through said window structure are positioned laterally outside of planes extending from the refueling envelope side boundaries to the eye reference point, (3) the lower viewing limit of the window structure is below a plane extending from the lower envelope boundary to the eye reference point.

2. The improvement as recited in claim 1, where said station further comprises an instrument panel positioned at a longitudinal location generally coinciding with said window structure, said leg accommodating structures extending rearwardly beyond said instrument panel.

3. The improvement as recited in claim 2, wherein each of said leg accommodating structures has an entrance portion positioned at approximately a knee location of an operator positioned in said seat, and said window structure and said instrument panel are located longitudinally at approximately said knee location.

4. The improvement as recited in claim 1, wherein each of said leg accommodating structures has an entrance portion positioned at approximately a knee location of an operator positioned in said seat, and said window structure is located longitudinally at approximately said knee location.

5. The improvement as recited in claim 1, wherein said seat is provided with a pair of arm rests positioned laterally on opposite sides of said seat, and an operating handle for controlling said boom at each of said arm rests.

6. The improvement as recited in claim 1, wherein said seat is both horizontally and vertically adjustable to accommodate operators of different body sizes, so as to be capable of maintaining a substantially constant eye reference point.

7. The improvement as recited in claim 1, wherein there is a track mechanism proximate said operator seat, said track mechanism having a first track portion extending along said transverse axis at a location forward of said operator seat and having at least one second track portion extending generally longitudinally and along one side of said operator seat, said improvement further comprising a second seat, said second seat being mounted for movement along said track mechanism, whereby an observer or instructor is able to be positioned in said second seat and obtain a view of said refueling envelope through said window structure.

8. The improvement as recited in claim 1, wherein there is a track mechanism extending along said transverse axis at a location forward of said seat and having a pair of second track portions extending generally longitudinally and on opposite sides of said operator seat, said improvement further comprising a second seat, said second seat being mounted for movement along said track mechanism, whereby an observer or instructor is able to be positioned in said second seat and obtain a view of said refueling envelope through said window structure.

9. The improvement as recited in claim 7, wherein said second seat has a base member mounted to said track mechanism, and said second seat is mounted for rotation about a vertical axis relative to said base member and for horizontal lineal movement with respect to said base member, whereby said second seat can be moved closer to or further from said operator seat and rotated to a desired position for proper observation of said refueling envelope.

10. The improvement as recited in claim 1, further comprising an auxiliary viewing device, which auxiliary viewing device comprises a first mirror means located proximate a lower edge of said window structure and having a reflective surface directed upwardly and rearwardly, and a second mirror means positioned proximate an upper edge of said window structure and having a reflective surface directed downwardly and forwardly, said first and second mirror means being so positioned relative to said eye reference point that light from an area above said direct viewing area is reflected by said first and second mirror means to said eye reference point.

11. The improvement as recited in claim 10, wherein said first mirror means extends downardly and rearwardly from a lower edge of said window structure, and said second mirror means extends downwardly and rearwardly from an upper edge of said window structure.

12. The improvement as recited in claim 1, wherein;
a. each of said leg accommodating structures has an entrance portion positioned at approximately a knee location of an operator positioned in said seat, and said window structure is located longitudinally at approximately said knee location,
b. said seat is provided with a pair of arm rests positioned laterally on opposite sides of said seat, and an operating handle for controlling said boom at each of said arm rests,
c. said seat is both horizontally and vertically adjustable to accommodate operators of different body sizes, so as to be capable of maintaining a substantially constant eye reference point,
d. said improvement further comprises an auxiliary viewing device, which auxiliary viewing device comprises a first mirror means located proximate a lower edge of said window structure and having a reflective surface directed upwardly and rearwardly, and a second mirror means positioned proximate an upper edge of said window structure and having a reflective surface directed downwardly and forwardly, said first and second mirror means being so positioned relative to said eye reference point that light from an area above said direct viewing area is reflected by said first and second mirror means to said eye reference point.

13. The improvement as recited in claim 12, wherein;
a. there is a track mechanism having a first track portion extending along said transverse axis at a location forward of said seat and having a pair of second track portions extending generally longitudinally and on opposite sides of said operator seat, said improvement further comprising a second seat, said second seat being mounted for movement along said track mechanism, whereby an observer or instructor is able to be positioned in said second seat and obtain a view of said refueling envelope through said window structure,
b. said second seat has a base member mounted to said track mechanism, and said second seat is mounted for rotation about a vertical axis relative to said base member and for horizontal lineal movement with resect to said base member, whereby said second seat can be moved closer to or further from said operator seat and rotated to a desired position for proper observation of said refueling envelope.

14. In an aircraft comprising a fuselage with a longitudinal centerline, a transverse axis, a forward and a rear end, said aircraft having a refueling boom extending rearwardly from said aircraft and having a refueling boom envelope within which said boom operates during a refueling operation, said envelope having upper, lower and side envelope boundaries, the improvement comprising an operating station for said boom, said station comprising:

a. an operator seat at a lower portion of said fuselage, said seat having a platform and a back rest arranged to establish a rearwardly directed eye reference point for an operator positioned on said seat, b. two leg accomodating structures in the form of leg wells extending rearwardly and divergently from said operator seat in a manner to receive legs of an operator positioned in said seat, c. a window structure positioned rearwardly of said eye reference point at a location between said leg accomodating structures, with said leg accommodating structures extending rearwardly from said window structure, said window structure providing a direct viewing area defined by upper, lower, and side viewing limits, d. said seat, leg accomodating structures, and said window structure being positioned and arranged relative to each other and to said refueling envelope in a manner that:

1. the upper viewing limit through said window structure is located at least as high as a plane extending from the upper envelope boundary to the eye reference point,
2. said leg accomodating structures and the side viewing limits through said window structure are positioned laterally outside of planes extending from the refueling envelope side boundaries to the eye referenece point,
3. the lower viewing limit of the window structure is below a plane extending from the lower envelope boundary to the eye reference point.

15. The improvement as recited in claim 14, where said station further comprises an instrument panel positioned at a longitudinal location generally coinciding with said window structure, said leg accommodating structures extending rearwardly beyond said instrument panel.

16. The improvement as recited in claim 15, wherein each said leg accommodating structures has an entrance portion positioned at approximately a knee location of an operator positioned in said seat, and said window structure and said instrument panel are located longitudinally at approximately said knee location.

17. The improvement as recited in claim 14, wherein each of said leg accommodating structures has an entrance portion positioned at approximately a knee location of an operator positioned in said seat, and said window structure is located longitudinally at approximately said knee location.

18. The improvement as recited in claim 14, wherein said seat is provided with a pair of arm rests positioned laterally on opposite sides of said seat, and an operating handle for controlling said boom at each of said arm rests.

19. The improvement as recited in claim 14, wherein said seat is both horizontally and vertically adjustable to accommodate operators of different body sizes, so as to be capable of maintaining a substantially constant eye reference point.

20. The improvement as recited in claim 14, wherein there is a track mechanism proximate said operator seat, said track mechanism having a first track portion extending along said transverse axis at a location forward of said operator seat and having at least one second track portion extending generally longitudinally and along one side of said operator seat, said improvement further comprising a second seat, said second seat being mounted for movement along said track mechanism, whereby an observer or instructor is able to be positioned in said second seat and obtain a view of said refueling envelope through said window structure.

21. The improvement as recited in claim 14, wherein there is a track mechanism extending along said transverse axis at a location forward of said seat and having a pair of second track portions extending generally longitudinally and on opposite sides of said operator seat, said improvement further comprising a second seat, said second seat being mounted for movement along said track mechanism, whereby an observer or instructor is able to be positioned in said second seat and obtain a view of said refueling envelope through said window structure.

22. The improvement as recited in claim 21, wherein said second seat has a base member mounted to said track mechanism, and said second seat is mounted for rotation about a vertical axis relative to said base member and for horizontal lineal movement with respect to said base member, whereby said second seat can be moved closer to or further from said operator seat and rotated to a desired position for proper observation of said refueling envelope.

23. The improvement as recited in claim 14, further comprising an auxiliary viewing device, which auxiliary viewing device comprises a first mirror means located proximate a lower edge of said window structure and having a reflective surface directed upwardly and rearwardly, and a second mirror means positioned proximate an upper edge of said window structure and having a reflective surface directed downwardly and forwardly, said first and second mirror means being so positioned relative to said eye reference point that light from an area above said direct viewing area is reflected by said first and second mirror means to said eye reference point.

24. The improvement as recited in claim 23, wherein said first mirror means extends downwardly and rearwardly from a lower edge of said window structure, and said second mirror means extends downwardly and rearwardly from an upper edge of said window structure.

25. The improvement as recited in claim 14, wherein a. each of said leg accommodating structures has an entrance portion positioned at approximately a knee location of an operator positioned in said seat, and said window structure is located longitudinally at approximately said knee location, b. said seat is provided with pair of arm rests positioned laterally on opposite sides of said seat, and an operating handle for controlling said boom at each of said arm rests, c. said seat is both horizontally and vertically adjustable to accomodate operators of different body sizes, so as to be capable of maintaining a substantially constant eye reference point, d. said improvement further comprises an auxiliary viewing device, which auxiliary viewing device comprises a first mirror means located proximate a lower edge of said window structure and having a reflective surface directed upwardly and rearwardly, and a second mirror means positioned proximate an upper edge of said window structure and having a reflective surface directed downwardly and forwardly, said first and second mirror means being so positioned relative to said eye reference point that light from an area above said direct viewing area is reflected by said first and second mirror means to said eye reference point.

26. The improvement as recited in claim 25, wherein;
a. there is a track mechanism having a first track portion extending along said transverse axis at a location forward of said seat and having pair of second track portions extending generally longitudinally and on opposite sides of said operator seat, said improvement further comprising a second seat, said second seat being mounted for movement along said track mechanism, whereby an observer or instructor is able to be positioned in said second seat and obtain a view of said refueling envelope through said window structure.
b. said second seat has a base member mounted to said track mechanism, and said second seat is mounted for rotation about a vertical axis relative to said base member and for horizontal lineal movement with respect to said base member, whereby said second seat can be moved closer to or further from said operator seat and rotated to a desired position for proper observation of said refueling envelope.

* * * * *